United States Patent [19]

Kawasaki

[11] Patent Number: 4,788,601
[45] Date of Patent: Nov. 29, 1988

[54] VIDEO SIGNAL REPRODUCING APPARATUS WITH H SYNC DISCONTINUITY CORRECTION

[75] Inventor: Somei Kawasaki, Tokyo, Japan

[73] Assignee: Canon Kabushiki Kaisha, Tokyo, Japan

[21] Appl. No.: 910,404

[22] Filed: Sep. 22, 1986

[30] Foreign Application Priority Data

Sep. 20, 1985 [JP] Japan ................. 60-206334

[51] Int. Cl.⁴ ............................................. H04N 5/94
[52] U.S. Cl. .................................... 358/336; 358/155
[58] Field of Search ............... 358/313, 314, 319, 324, 358/325, 326, 336, 337, 339, 342, 26, 36, 37, 167, 166, 155; 360/37.1, 38.1; 380/11, 15

[56] References Cited

U.S. PATENT DOCUMENTS

| | | | |
|---|---|---|---|
| 4,591,898 | 5/1986 | DeBoer et al. | 360/38.1 |
| 4,628,369 | 12/1986 | Ichinoi et al. | 358/314 |
| 4,665,444 | 5/1987 | Van der Werf et al. | 360/38.1 |
| 4,675,751 | 6/1987 | Yagi et al. | 358/342 |
| 4,686,583 | 8/1987 | Tomita et al. | 360/38.1 |
| 4,686,584 | 8/1987 | Kojina et al. | 360/37.1 |

Primary Examiner—Donald McElheny, Jr.
Attorney, Agent, or Firm—Robin, Blecker & Daley

[57] ABSTRACT

A video signal reproducing apparatus is provided with delay means for changing to a given degree at a time the phase of a reproduced horizontal synchronizing signal included in a reproduced video signal which is taken out from a recording medium. When the reproduced horizontal synchronizing signal becomes discontinuous, the discontinuous signal is replaced with the output signal of the delay means until the phase of the output signal comes to coincide with the phase of the reproduced horizontal synchronizing signal. The delay means includes a delay line which delays the horizontal synchronizing signal for one horizontal scanning period and a delay circuit which is arranged to further delay for a short period of time the signal delayed and produced from the delay line.

16 Claims, 4 Drawing Sheets

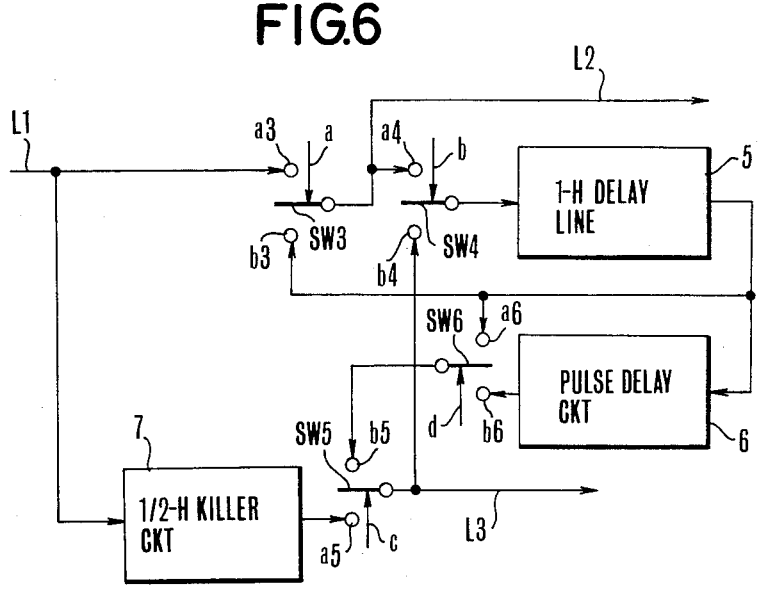

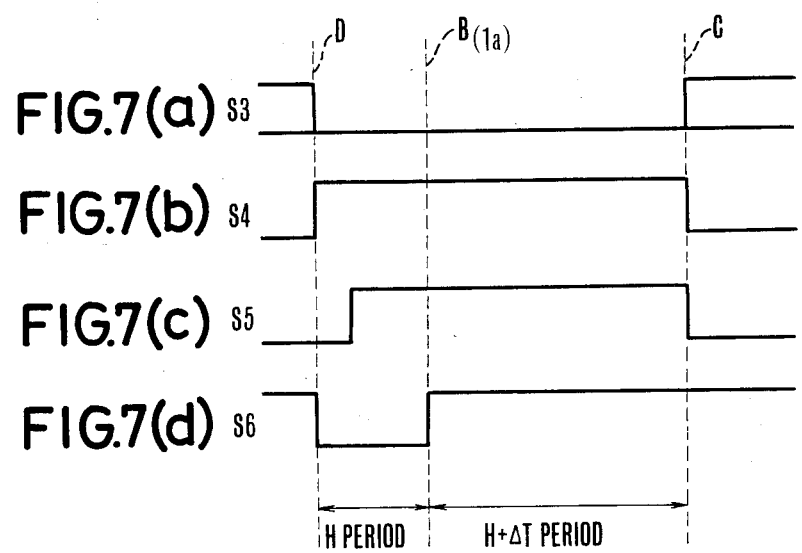

VIDEO SIGNAL REPRODUCING APPARATUS WITH H SYNC DISCONTINUITY CORRECTION

BACKGROUND OF THE INVENTION

1. Field of the Invention

This invention relates to a video signal reproducing apparatus having means for correcting the so-called skew condition which results from discontinuation of a horizontal synchronizing signal occurring during reproduction of a video signal from a recording medium.

2. Description of the Related Art

In repeatedly reproducing one field portion of a video signal recorded in a recording track with a video signal recording and reproducing apparatus, a reproduced horizontal synchronizing signal becomes discontinuous at the start-and-end point of the record. As a result, the upper part of an image plane thus obtained becomes obliquely distorted. This is called a skew phenomenon. For example, referring to FIG. 1 of accompanying drawings, when one field portion of a video signal recorded in a circular track T2 on a disc-shaped recording medium is to be repeatedly reproduced, a horizontal synchronizing signal included in the record comes to discontinue for a period of ½ H (H representing a horizontal scanning period) at a start-and-end point 1a. The illustration includes a PG pin 1d which is made of a magnetic material and is arranged to indicate a position corresponding to the start-and-end point 1a. The horizontal synchronizing signal is, in general, supplied to an AFC circuit 2 which is, for example, arranged as shown in FIG. 2 before it is supplied to a horizontal drive circuit (not shown) within an image receiver. The AFC circuit 2 consists of a voltage controlled oscillator (hereinafter referred to as VCO) 2a; a trapezoidal wave generating circuit 2b; and a sample-and-hold circuit 2c. The reproduced horizontal synchronizing signal taken out from the recording medium 1 is supplied to the sample-and-hold circuit 2c of the AFC circuit 2. Then, a horizontal synchronizing signal which is to be used at the horizontal drive circuit is taken out from the VCO 2a.

FIG. 3 shows the wave form of the signal produced from the trapezoidal wave generating circuit 2b of the AFC circuit 2. In FIG. 3, a point A indicates a point at which the signal is sampled and held by the sample-and-hold circuit 2c. The point A is located at the middle point of a linear line part in the output wave form. The period t of the linear part is shorter than one H period. Therefore, a period of time t1 between commencement of scanning for one H period and the point A is in a relation t1 < ½ H to the period H. Therefore, when the horizontal synchronizing signal in which the ½ H discontinuity arises as mentioned above comes to the sample-and-hold circuit 2c, a certain period of time is required after deviation from synchronism and before resumption of the synchronism at the AFC circuit 2. Therefore, picture quality is greatly deteriorated by the occurrence of the skew condition having an oblique distortion in the upper part of the image reproduced on a Braun tube by the signal produced from the VCO 2a before resumption of synchronism.

To avoid the adverse effect of the deviation from synchronism due to the ½ H jump of the reproduced horizontal synchronizing signal, a method of compensating for the above-stated discontinuity of the horizontal synchronizing signal has been known. In this method, an ultrasonic delay line is used for obtaining a H/2 delayed signal by having the field signal of one and the same track allowed either to pass through the H/2 delay line or not to pass through the delay line. The H/2 delayed signal and the signal not delayed are then alternately produced via switching means to compensate for the discontinuity. This method, however, necessitates use of means for effecting the H/2 delay and has presented a problem that it results in a complex structural arrangement.

In view of this, a device which is capable of preventing the skew condition with a simple structural arrangement is disclosed in Japanese Laid-Open Patent Application No. Sho 49-127518. In the case of this device, the scanning period including the H/2 phase deviation which inevitably exists in each field frame unit of a reproduced video signal is removed by gating. During the gate removing scanning period, an oscillator which produces pulses at a period somewhat longer than one H period is allowed to oscillate by itself. The skew condition is prevented by using the oscillation output of the oscillator as a horizontal synchronizing signal and by replacing the period including the gate removed H/2 phase deviation with a dummy horizontal synchronizing signal which equally divides the H/2 deviation including period. In the case of such a device, the free running oscillation period of the above-stated oscillator must be accurately maintained. However, the oscillation period is apt to be affected by the drift of temperature, etc. In the event of even an error of only several percent due to such a change in temperature, the horizontal synchronizing signal becomes discontinuous upon cancellation of the gate removing state. In that event, not only it is impossible to attain any skew correcting effect but sometimes a contrary effect might result.

SUMMARY OF THE INVENTION

It is a general object of this invention to provide a novel video signal processing device which adequately prevents the skew distortion phenomenon by eliminatng the above-stated shortcomings of the prior art devices.

It is a more specific object of this invention to provide signal processing device which is capable of accurately and reliably preventing the skew distortion phenomenon against such external disturbances as temperature variations or the like.

It is another object of this invention to provide a video signal processing device which is capable of accurately and reliably preventing the skew distortion phenomenon with a simple structural arrangement.

To attain these objects, a video signal processing device arranged according to this invention as an embodiment thereof comprises: one-horizontal scanning period (1-H) delay means which is provided within a video signal processing circuit for the purpose of compensating for a drop-out; a delay circuit arranged to further delay for a short period of time a signal which has been delayed by the one-horizontal period delay means; and an arrangement by which a horizontal synchronizing signal delayed by the delay means and the delay circuit and obtained while the synchronizing signal is continuous is added to a reproduced video signal when a horizontal synchronizing signal included in the video signal comes to discontinue during the process of taking out the video signal from a recording medium.

Further objects and features of this invention will become apparent from the following detailed descrip-

BRIEF DESCRIPTION OF THE DRAWINGS

FIGS. 5(a) to 5(d) show in a timing chart the operation of the first embodiment shown in FIG. 4.

FIGS. 6 and 7(a) to 7(d) are a block diagram and a timing chart showing the arrangement and operation of a device arranged as a second embodiment of this invention.

DETAILED DESCRIPTION OF THE PREFERRED EMBODIMENTS

Figure 1:
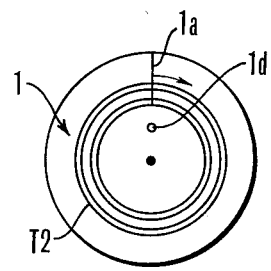
FIG. 1 is a plan view showing a recording medium from which a record is to be reproduced by a device embodying this invention.
Figure 2:
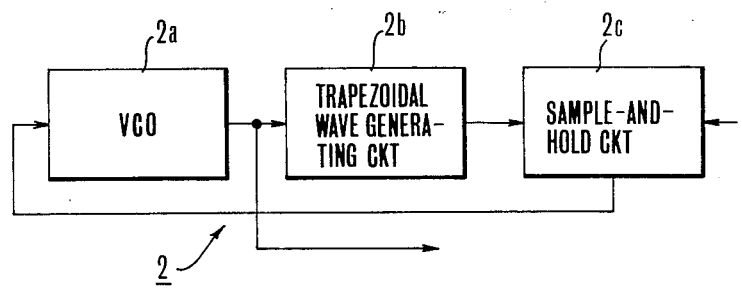
FIG. 2 is a block diagram showing the arrangement of an AFC circuit 2.
Figure 3:
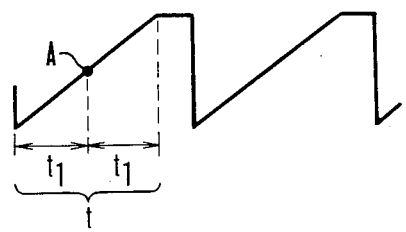
FIG. 3 is a wave form chart showing the wave form of a signal produced from a trapezoidal wave generating circuit 2b which is included in the AFC circuit 2 of FIG. 2.

Referring to FIGS. 4 and 5(a) to 5(d), an embodiment of this invention is arranged as follows: Switches SW3, SW4 and SW5 are arranged to be operated by control signals S3, S4 and S5 which are as shown in FIGS. 5(c), 5(b) and 5(d). These switches are connected to their terminals b3, b4 and b5 when the control signals S3, S4 and S5 are at high levels and to their other terminals a3, a4 and a5 when the signals S3, S4 and S5 are at low levels. A 1-H delay line 5 is arranged to be capable of delaying not only the video signals but also a pulse signal as in the case of a CCD delay line. The delay line 5 has its input terminal connected to the switch SW4 and its output terminal to the terminal b3 of the switch SW3 and a pulse delay circuit 6. The 1-H delay line 5 and the switches SW3 and SW4 jointly form a loop which is arranged by utilizing a drop-out correction circuit employed in a luminance signal reproducing system. An input line L1 is arranged to supply a reproduced video signal. An output line L2 is arranged to produce a signal which has undergone a drop-out correcting process. Another output line L3 is arranged to produce a separated synchronizing signal. The pulse delay circuit 6 is arranged to further delay as much as a length of time $\Delta T$ a horizontal synchronizing signal which comes from the 1-H delay line 5. Delay means is thus formed jointly by the 1-H delay line 5 and the pulse delay circuit 6. The output of the latter is supplied to one terminal b5 of the switch SW5. A ½ H killer circuit 7 is arranged to allow only the pulses of 1-H to pass through there while removing the ½ H period pulses of the reproduced luminance signal coming from the signal line L1. The output terminal of the circuit 7 is connected to the terminal a5 of the switch SW5. The horizontal synchronizing signal which is allowed to pass through the circuit 7 is supplied to the signal line L3. A reproducing head 10 is arranged to reproduce signals recorded on the recording medium 1. An amplifier 11 is arranged to amplify the output of the head 10. A demodulator 12 is arranged to demodulate the output of the reproducing head 10. A synchronizing signal separating circuit 13 is arranged to separate a synchronizing signal from the video signal demodulated by the demodulator 12. A drop-out detecting circuit 14 is arranged to detect drop-out in the video signal demodulated. A PG detecting circuit 16 is arranged to detect the position of a PG pin from the output of a PG detecting head 17. A control signal generating circui 15 is arranged to generate control S3, S4 and S5 according to the outputs of the synchronizing signal separating circuit 13, the drop-out detecting circuit 14 and the PG detecting circuit 16 in such a manner as shown in FIGS. 5(c), 5(b) and 5(d). A motor 20 is arranged to rotate the recording medium 1.

FIG. 5(a) shows a horizontal synchronizing signal reproduced from the video signal. FIG. 5(b) shows the control signal for the switch SW4. FIG. 5(c) is the control signal for the switch SW3 and FIG. 5(d) the control signal for the switch SW5.

In the skew distortion correcting circuit which is arranged in this manner, under normal condition, the switch SW3 is connected to the terminal a3, the switch SW4 to the terminal a4 and the switch SW5 to the terminal a5 respectively. With the switches in these connecting positions, the reproduced luminance signal coming via the signal line L1 is supplied via the switch SW3 to the signal line L2 as it is. In case that a drop-out is detected in the luminance signal on the signal line L1, the level of the control signal S3 becomes high. The connecting position of the switch SW3 then shifts to the terminal b3. Meanwhile, other control signals S4 and S5 remain at a low level. Therefore, the signal produced to the signal line L2 is, in that instance, replaced with a luminance signal which is preceding the former by one H period and is produced from the 1-H delay line 5 connected to the terminal b3 of the switch SW3.

In other words, as long as the control signal S3 is at a high level and the control signals S4 and S5 are at a low level, a loop consisting of the switch SW3, the 1-H delay line 5 and the switch SW3 repeatedly obtains for correcting the drop-out in the reproduced luminance signal. The horizontal synchronizing signal is supplied to the signal line L3 via the ½ H killer circuit 7 and the switch SW5. The video signal is reproduced in synchronism with this horizontal synchronizing signal.

When the position of the head which is not shown reaches the start-and-end point 1a of a track on the recording medium 1, the ½ H discontinuation of the horizontal synchronizing signal takes place in the same manner as in the case of the conventional device. In the case of this embodiment, however, the level of the control signal S4 becomes high as shown in FIG. 5(b) at a point several H periods before the point 1a (a given period of time T4 before the point 1a). The switch SW4 is thus connected to the terminal b4. Therefore, after this point of time, the horizontal synchronizing signal which is produced from the ½ H killer circuit 7 is supplied to the 1-H delay line 5 via the terminal a5 of the switch SW5 and the terminal b4 of the switch SW4. When the reproducing head comes to the start-and-end point 1a, the level of the control signal S5 becomes high as shown in FIG. 5(d). This causes the connecting position of the switching SW5 to shift to the terminal b5. This forms a loop consisting of the 1-H delay line 5, the pulse delay circuit 6, the terminal b5 of the switch SW5 and the terminal b4 of the switch SW4. Through this loop, the horizontal synchronizing signal for the period of time T4 shown in FIG. 5 is delayed by both the 1-H delay line 5 and the pulse delay circuit 6. In other words, the pulse intervals of the horizontal synchronizing signal supplied to the signal line L3 are caused to become $H + \Delta T$ by the 1-H delay line 5 and the pulse delay circuit 6. This causes the phase of the horizontal synchronizing signal to change as much as $\Delta T$ at a time in the same manner as in the case of the conventional device until it comes to coincides with the phase of the normal synchronizing signal at a point C. Assuming that the jump period at the start-and-end point 1a is a 1/2 H period, the horizontal synchronizing signal comes to coincide with the normal signal at the point C when there obtains the following relation:

$$\tfrac{1}{2} H = N \times \Delta T \qquad (1)$$

Then, the deviation from synchronism is normalized. Further, at this point of time C, the level control signal S5 becomes low to shift the connecting position of the switch SW5 to its terminal a5. After that, the horizontal synchronizing signal having normal pulse intervals is again supplied via the $\tfrac{1}{2}$ H killer circuit 7 to the signal line L3.

In the H+$\Delta T$ delaying operation, the delay time of the 1-H delay line 5 for the drop-out compensation is very accurate and is not affected by such disturbance as changes in temperature or the like. Therefore, the deviation from synchronism presents no problem. Further, since the pulse delay circuit 6 is arranged to make pulse delay just for a period of time $\Delta T$ which is sufficiently shorter than the H period of the pulse delay circuit 6 ($\Delta T = H/2$ H), even if there arises some error at the point C, the error is very small and brings about no jump of the horizontal synchronizing signal. Assuming that the value of N in Formula (1) is 20, the period of time $\Delta T$ becomes 1/40 H. Then, even if the error of the pulse delay circuit 6 is 10% or thereabout, the error or discontinuity of the horizontal synchronizing signal at the point C is only H/20 ($=1/40$ H$\times$1/10$\times$20). This degree of deviation from synchronism presents no problem also for the AFC circuit. Therefore, the H+$\Delta T$ delaying operation is highly precise and accurately accomplished to solve the problem of the image plane distortion due to deviation from synchronism.

The period of time between points D and C during which the drop-out correcting 1-H delay line 5 is to be used for correction of the horizontal synchronizing signal does not exceed a vertical blanking period which does not appear on the image plane of the image receiver. Therefore, the above-stated drop-out correction is not necessary. Hence, there arises no problem with the switch SW4 connected to its terminal b4 as shown in FIG. 5(b).

In the embodiment described, the existing 1-H delay line 5 which is generally in use for a drop-out correction circuit of the luminance signal reproducing system is utilized also for correcting the skew distortion. This permits simplification of structural arrangement and reduction in cost.

Further, in the embodiment, the connecting position of the switch SW5 is arranged to be shifted from one position to another at the start-and-end point 1a of FIG. 1 as shown in the timing chart of FIGS. 5(a) to 5(d). However, use of the output of the above-stated PG detecting circuit 16 for detection of such a start-and-end point 1a presents the following problem: After the switch SW5 is shifted from one position to another, the horizontal synchronizing signal received immediately before the shift is delayed by the 1-H delay line 5 and the pulse delay circuit 6 before it is supplied to the line L3. However, if the point 1a does not coincide with the position of the PG pin 1d and there is a difference between them, the $\tfrac{1}{2}$ H discontinuity has already taken place in the horizontal synchronizing signal immediately before the change-over of the connecting position of the switch SW5. In that event, the horizontal synchronizing signal including the discontinuous part is delayed by the 1-H delay line 5 and the pulse delay circuit 6. As a result, the skew condition would not be prevented and the deviation from synchronism would be increased. In view of this problem, a second embodiment of this invention is arranged to solve it.

Figure 4:
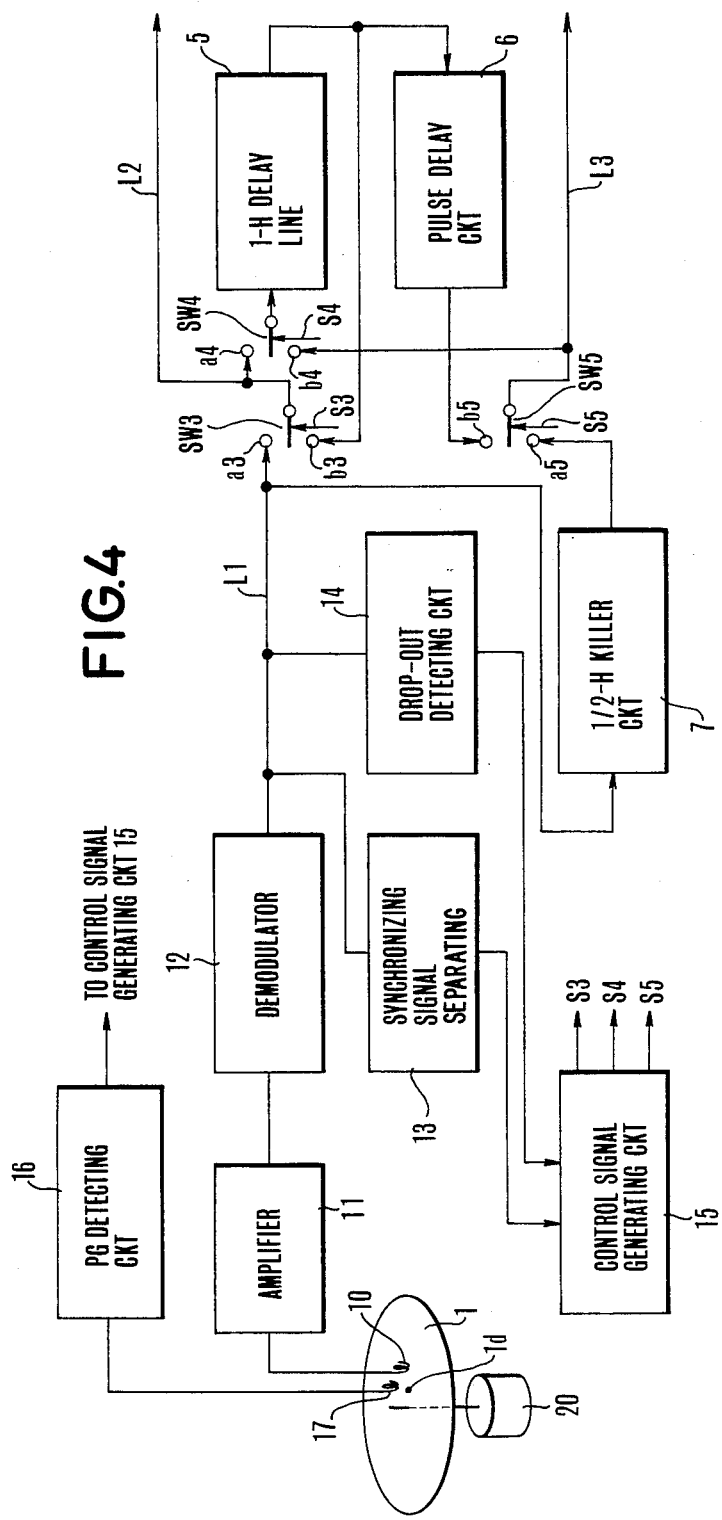
FIG. 4 is a block diagram showing the arrangement of a device embodying this invention as a first embodiment thereof.

FIGS. 6 and 7(a) to 7(d) show the second embodiment of this invention. FIG. 6 shows only the essential parts of the embodiment while other parts which are the same as those shown in FIG. 4 are omitted from the following description. The second embodiment is characterized by the provision of a switch SW6 in between the pulse delay circuit 6 and the switch SW5. Referring to the time chart of FIGS. 7(a) to 7(d), the embodiment arranged as shown in FIG. 6 operates as follows:

FIG. 7(a) shows a pulse corresponding to FIG. 5(c). FIG. 7(b) shows a pulse corresponding to FIG. 5(b) FIG. 7(c) shows a pulse corresponding to FIG. 5(d). FIG. 7(d) represents a signal arranged to drive the switch SW6. In the second embodiment, unlike the arrangement shown in FIGS. 5(a) to 5(d), the level of the control signal S5 which drives the switch SW5 is raised to shift the switch SW5 to the terminal b5 at a timing earlier than the point of time B. With the connecting position of the switch SW5 shifted to the terminal b5, the position of the switch SW6 is on the side of the terminal a6. Under this condition, the horizontal synchronizing signal being delayed by the 1-H delay line 5 is delayed through a loop consisting of the terminal a6 of the switch SW6, the terminal b5 of the switch SW5, the terminal b4 of the switch SW4 and again the 1-H delay line 5. Following this, at a point of time B, the position of the switch SW6 is shifted from the terminal a6 to the other terminal b6. By this, the horizontal synchronizing signal is further delayed by the pulse delay circuit 6 in addition to the 1-H delay line 5. The delayed horizontal synchronizing signal is then supplied to the line L3.

In the second embodiment, a horizontal synchronizing signal is taken in at a point of time a given period of time earlier than a point of time at which the horizontal synchronizing signal becomes discontinuous and is delayed by the 1-H delay line 5 and the pulse delay circuit 6. This arrangement effectively solves the above-stated problem wherein that the horizontal synchronising signal is delayed after occurrence of $\tfrac{1}{2}$ H discontinuity thereof and then the deviation from synchronism would increase.

In accordance with the arrangement of this embodiment as mentioned in the foregoing, the greater part of the delay time by the delay means is effected by the 1-H delay circuit. Therefore, the skew distortion correcting operation can be accurately and reliably accomplished without being affected by external disturbances such as temperature drift or the like.

In accordance with the conventional method of carrying out skew correction by means of a $\tfrac{1}{2}$ H delay line, a signal delayed by the $\tfrac{1}{2}$ H delay line and a signal not delayed are produced for every field. However, the conventional method tends to have signal attenuation due to the delay line and thus to have some flicker on the reproduced image plane of a monitor. Whereas, in accordance with this invention, such flicker never takes place because the reproduced luminance signal is not subjected to the above-stated process.

What is claimed is:

1. A video signal processing device comprising:
    (a) separating means for receiving said video signal and for separating a horizontal synchronizing signal from said video signal;
    (b) delay means for receiving and delaying such separated horizontal synchronizing signal, said delay means including
        (1) a first circuit for delaying said separated horizontal synchronizing signal for one horizontal scanning period and for generating an output signal indicative thereof, and
        (2) a second circuit for receiving said first circuit output signal and for delaying such received signal for a period of time shorter than one horizontal scanning period and generating an output signal indicative thereof; and
    (c) output means for furnishing said video signal selectively with said second circuit output signal during a predetermined time period.

2. A device according to claim 1, wherein said video signal has a vertical blanking period and wherein said predetermined time period corresponds to said vertical blanking period.

3. A device according to claim 2, further comprising detecting means for detecting the blanking period of said video signal.

4. A device according to claim 1, wherein said video signal is recorded on a recorded medium, said device further comprising reproducing means for reproducing said video signal from said recording medium.

5. A device according to claim 4, wherein said recording medium is a disc-shaped medium.

6. A device according to claim 5, wherein said disc-shaped recording medium has recording tracks formed in a concentric manner, and wherein one field portion of said video signal is recorded in each of said recording tracks.

7. A video signal processing device comprising:
    (a) separating means for receiving said video signal and for separating a synchronizing signal from said video signal;
    (b) delay means for receiving and delaying an incoming signal for a predetermined period; and
    (c) switching means for selectively supplying said delay means with either said separated synchronizing signal or with said video signal.

8. A device according to claim 7, wherein said synchronizing signal is a horizontal synchronizing signal and wherein said predetermined period is longer than one horizontal scanning period.

9. A device according to claim 7, further comprising:
    (d) detecting means for detecting that said synchronizing signal is discontinuous, and wherein said detecting means being operative thereupon to cause said switching means to supply said separated synchronizing signal to said delay means.

10. A device according to claim 9, further comprising:
    (d) further detecting means for receiving said video signal and for detecting a video drop-out in said video signal; and
    (e) means for producing as video signal output of said device a prior video signal delayed by said delay means when a drop-out is detected by said further detecting means.

11. A device according to claim 9, further comprising means for supplying a delayed synchronizing signal delayed by said delay means with said video signal when said synchronizing signal is detected to be discontinuous.

12. A video signal processing device comprising:
    (a) separting means for receiving said video signal and for separating a horizontal sychronizing signal from said video signal;
    (b) delay means for receiving and delaying said separated horizontal synchronizing signal for a predetermined period of time; and
    (c) means for supplying such delayed separated horizontal synchronizing signal with said video signal during a predetermined time period.

13. A device according to claim 12, wherein said predetermined period of time is different from one horizontal scanning period.

14. A device according to claim 13, wherein said predetermined period of time is longer than said one horizontal scanning period.

15. A device according to claim 12, wherein said video signal has a vertical blanking period and wherein said predetermined time period corresponds to said vertical blanking period.

16. A device according to claim 12, wherein said delay means delays said separated horizontal synchronizing signal and provides said delayed separated horizontal synchronizing signal repeatedly for every said predetermined period of time.

* * * * *